United States Patent [19]

Kwech

[11] Patent Number: 4,813,314
[45] Date of Patent: Mar. 21, 1989

[54] MULTI-FUNCTION PIPE MACHINING APPARATUS

[75] Inventor: Horst Kwech, Lake Bluff, Ill.

[73] Assignee: Westinghouse Electric Corp., Pittsburgh, Pa.

[21] Appl. No.: 208,713

[22] Filed: Jun. 20, 1988

Related U.S. Application Data

[62] Division of Ser. No. 902,284, Sep. 29, 1986, Pat. No. 4,770,074.

[51] Int. Cl.[4] .............................................. B23B 3/22
[52] U.S. Cl. ......................................... 82/113; 30/97; 82/128
[58] Field of Search ................ 82/4 C, 4 R; 30/95–98

[56] References Cited

U.S. PATENT DOCUMENTS

| 2,769,234 | 11/1956 | Young | 30/97 |
| 3,431,646 | 3/1969 | Young | 30/97 |
| 3,744,356 | 7/1973 | Slator et al. | 82/4 C |
| 4,342,239 | 8/1982 | Feamster, II | 82/4 C |
| 4,397,202 | 8/1983 | Mayfield | 82/4 R |
| 4,411,178 | 10/1983 | Wachs et al. | 82/4 C |

OTHER PUBLICATIONS

A brochure of Machine Cutting Inc., available at least as early as 1984.

A literature sheet of Tri Tool Incorporated bearing a copyright date of 1981.

Primary Examiner—Frederick R. Schmidt
Assistant Examiner—Robert Showalter

[57] ABSTRACT

A portable multi-function pipe machining apparatus has a plurality of different cutting attachments to provide a portable machining center. The apparatus has a split frame with an inner ring attachable to the outer periphery of a pipe and rotatably mounts an annular tool head which can carry a selected cutting attachment. The annular tool head is driven by one or more drive motors mounted on the inner ring and having driven gears which mesh with an external annular gear on the annular tool head. Each of the cutting attachments mounts a cutting tool for movement along one or more axes with the movement being derived from rotation of the annular tool head and more particularly by rotation of a driven gear associated with the cutting attachment which is rotated by a stationary tool driving gear 22 on the inner ring. The cutting attachments include a cutoff slide for single axis cutting, a cam slide to provide bevel cutting, an X-Y slide for dual axis cutting and a boring bar attachment for boring and which also has a radially movable tool slide to enable movement of a cutting tool both radially and axially of a pipe.

3 Claims, 16 Drawing Sheets

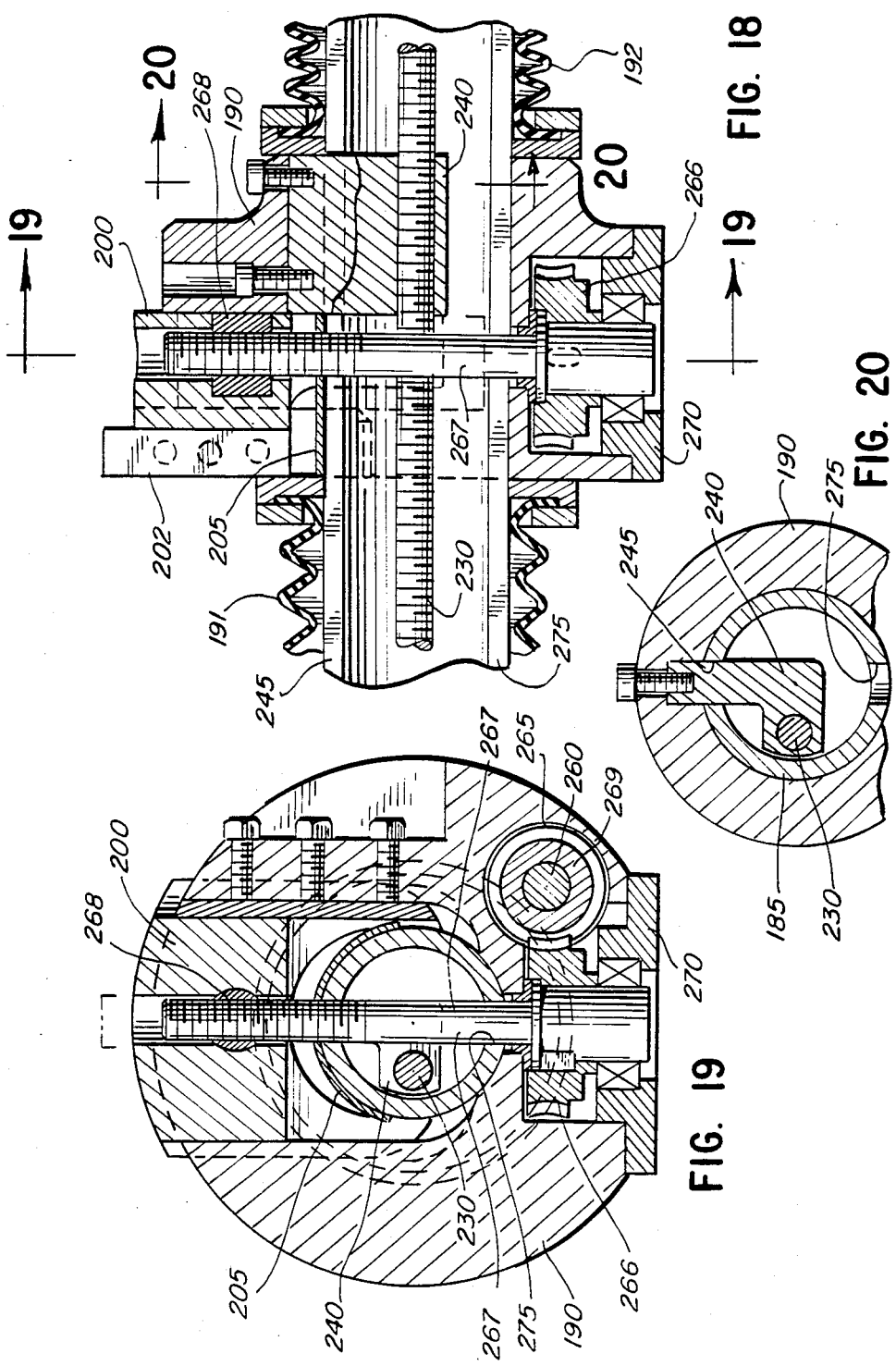

MULTI-FUNCTION PIPE MACHINING APPARATUS

This is a division of application Ser. No. 06/902,284, filed Aug. 29, 1986 now U.S. Pat. 4,770,074.

BACKGROUND OF THE INVENTION

1. Field of the Invention

This invention relates to a portable multi-function pipe machining apparatus capable of operating in the filed to perform many different types of machining operations on a pipe including cutoff, bevel cutting and boring. The pipe machining apparatus functions as a portable machining center. A split frame is mountable on a pipe externally thereof and has an annular tool head that can mount one or more of a series of unique interchangeable cutting attachments for rotation about the pipe and with the feed of a tool being derived from rotation of the annular tool head. The portable machine provides a wide range of machining capability in a relatively lightweight and compact package.

2. Description of the Prior Art

Portable machines having a split frame for mounting on the exterior of a pipe and having tooling for performing a plurality of different machining operations are known in the art.

The Young U.S. Pat. Nos. 2,769,234 and 3,431,646 show portable pipe machining apparatus having a split frame for mounting on the exterior of the pipe and which have an annular tool head with a cutting tool mounted on a tool slide. The tool slide is moved by indexing of a star wheel as the annular tool head rotates.

The Wachs and Kwech U.S. Pat. No. 4,411,178 discloses a pipe end preparation machine having a chuck positionable within the pipe for associating the machine with the pipe and with a plurality of motors for achieving rotation of an annular tool head and selective axial and radial feed of a tool.

There is also on the market a universal pipe lathe having a split frame and which can mount tooling for various machining operations including cutting, beveling and boring.

SUMMARY OF THE INVENTION

The invention relates to a pipe machining apparatus which is portable for use in the field and which has a series of unique interchangeable cutting attachments to provide a machining center to perform many different types of machining operations. The various machining operations are carried out by new and improved structure not previously known in the art.

More particularly, the apparatus has an inner ring and an external annular tool head defining a split frame which can be positioned on a pipe and locked in position by clamping structure associated with the inner ring. The annular tool head is rotatably mounted on the inner ring and has an external annular gear for driving of the annular tool head by drive means carried by the inner ring including a drive motor. A selected one of several cutting attachments can be mounted on the annular tool head. Means on the cutting attachment movably mount a tool and feeding of the tool results from rotation of the annular tool head relative to the inner ring and by rotation of a driven gear on the cutting attachment. The driven gear has a drive connection to an external annular tool driving gear fixed to the inner ring whereby relative movement between the annular tool head and the inner ring causes the feed movement of the tool.

The cutting attachments include attachments for single axis cutting, dual axis cutting and cam control cutting. Each of these attachments is independently mountable to the annular tool head and carries a driven gear as defined in the preceding paragraph which meshes with an idler gear on the annular tool head which meshes with the external annular tool driving gear on the inner ring. Each of the cutting attachments has a female tool slide member fixed to the annular tool head and rotatably mounting the driven gear and a tool slide member movable in the female slide member and which is moved by a releasable drive connection between the driven gear and the movable tool slide member. This releasable drive connection includes a clutch interposed between the driven gear and a threaded shaft connected to the movable tool slide member and a worm gear drive and with these latter components being mounted for easy interchange with other components of different pitch to provide the desired rate of advance of the cutting tool with respect to the rate of rotation of the annular too head.

The cutting attachment for dual axis cutting along X-Y axes includes the use of two cutting attachments generally of the type described in the preceding paragraph disposed for movement along perpendicular axes and with a drive connection from the driven gear of one cutting attachment to the worm gear drive of the other cutting attachment.

The cutting attachment for cam control cutting includes a cutting attachment generally of the type as used for cutting along a single axis of motion and with a third tool slide member carrying the cutting tool movable in the previously referred movable tool slide member and having a motion controlled by a cam carried by the female tool slide member and with the third tool slide member being urged to follow the cam.

An additional cutting attachment is a boring attachment including a cross head attachable to the annular tool head and extending across a central opening therein. A cylinder is fixed to the cross head and extends through the central opening of the annular tool head for disposition within a pipe and has a boring head movably mounted thereon for axial movement with means on the boring head for holding a cutting tool. The boring head is moved along the cylinder by means including a rotatable gear on the cross head which meshes with the external annular tool driving gear on the inner ring whereby the actual movement of a cutting tool is derived by and at a rate determined by the rate of rotation of the annular tool head. The boring head may have a tool slide carrying the cutting tool mounted thereon for movement transverse to the path of movement of the boring head and feed means for advancing the tool slide relative to the boring head includes a power take-off drive connection to the rotatable gear on the cross head.

An object of the invention is to provide a new and improved pipe machining apparatus which is portable for use in the field to perform different types of machining operations on a pipe by use of any one of a plurality of cutting attachments for movably mounting a cutting tool and with the feed of the tool being derived from a drive resulting from rotation of an annular tool head carrying the cutting attachment and by means of gearing that is interchangeable to vary the rate of cutting tool advance with respect to the rate of rotation of the annular tool head.

Still another object of the invention is to provide a pipe machining apparatus as defined in the preceding paragraph wherein the annular tool head is rotatably mounted on an inner ring which can be fixed to the pipe externally thereof and which carries an external annular tool driving gear and the annular tool head has an idler gear in mesh with the external annular tool driving gear and with the various cutting attachments having a driven gear which can mesh with the idler gear to drive gearing for moving a cutting tool as the annular tool head rotates about the inner ring.

Still another object of the invention is to provide a cutting attachment for a pipe machining apparatus including a female tool slide member mountable to a rotatable annular tool head and rotatably mounting a driven gear associated with a worm which meshes with a worm gear, and clutch means interconnecting the worm gear and a threaded shaft associated with a movable tool slide member whereby rotation of the driven gear in response to rotation of the annular tool head results in feeding movement of a cutting tool carried by the movable tool slide member.

Another object of the invention is to provide additional cutting attachments with can have structure generally as described in the preceding paragraph and with additional tool slide members to either provide for movement of a cutting tool about two mutually perpendicular axis or for movement of a cutting tool along one axis as well as cam controlled movement in a path transverse to said first axis of movement.

BRIEF DESCRIPTION OF THE DRAWINGS

FIG. 18 is a longitudinal section through the boring head;

FIG. 19 is a sectional view taken generally along the line 19—19 in FIG. 18; and FIG. 20 is a sectional view taken generally along the line 20—20 in FIG. 18.

DESCRIPTION OF THE PREFERRED EMBODIMENT

Figure 1:
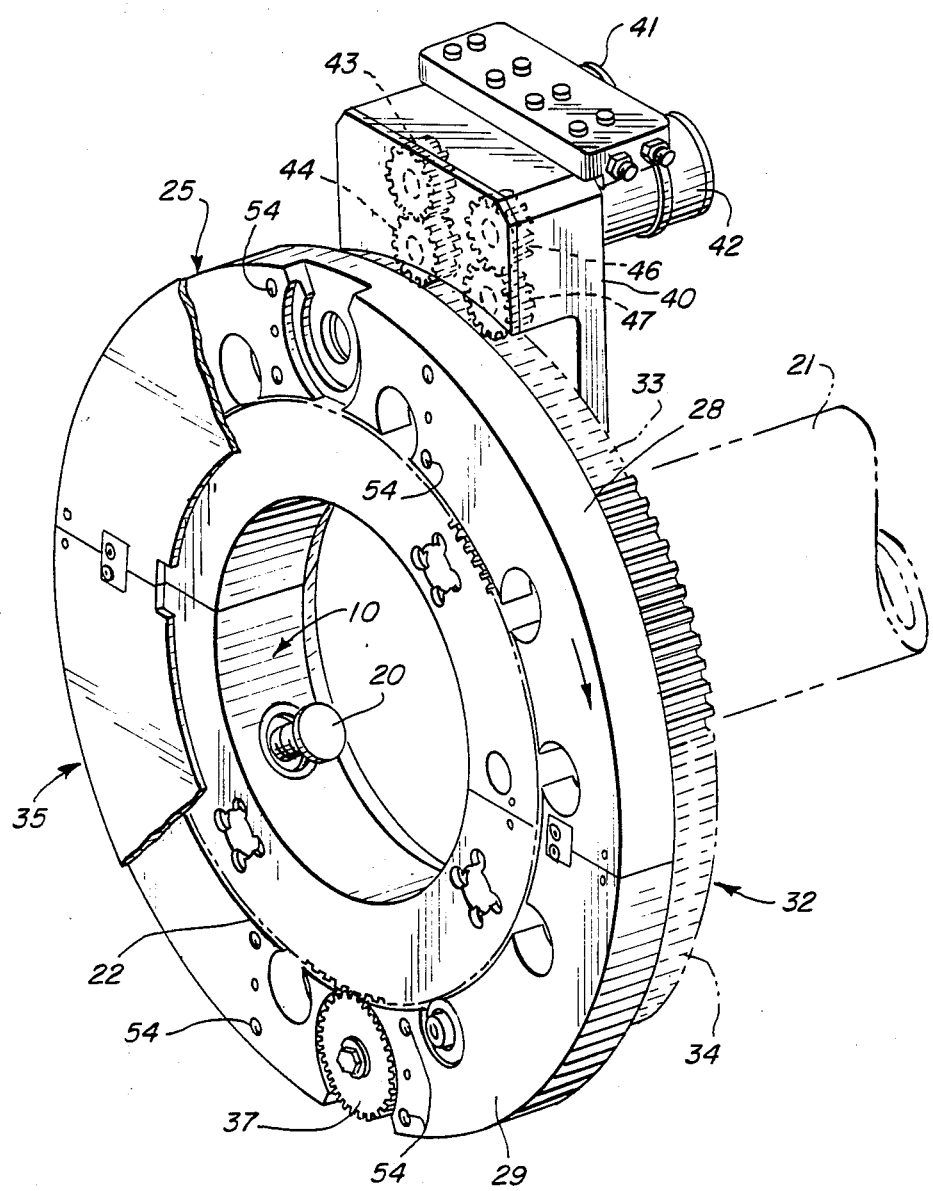
FIG. 1 is a perspective elevational view of a partially assembled basic split frame structure of the pipe machining apparatus with parts broken away and showing the general orientation to a pipe shown in broken lines.
Figure 2:
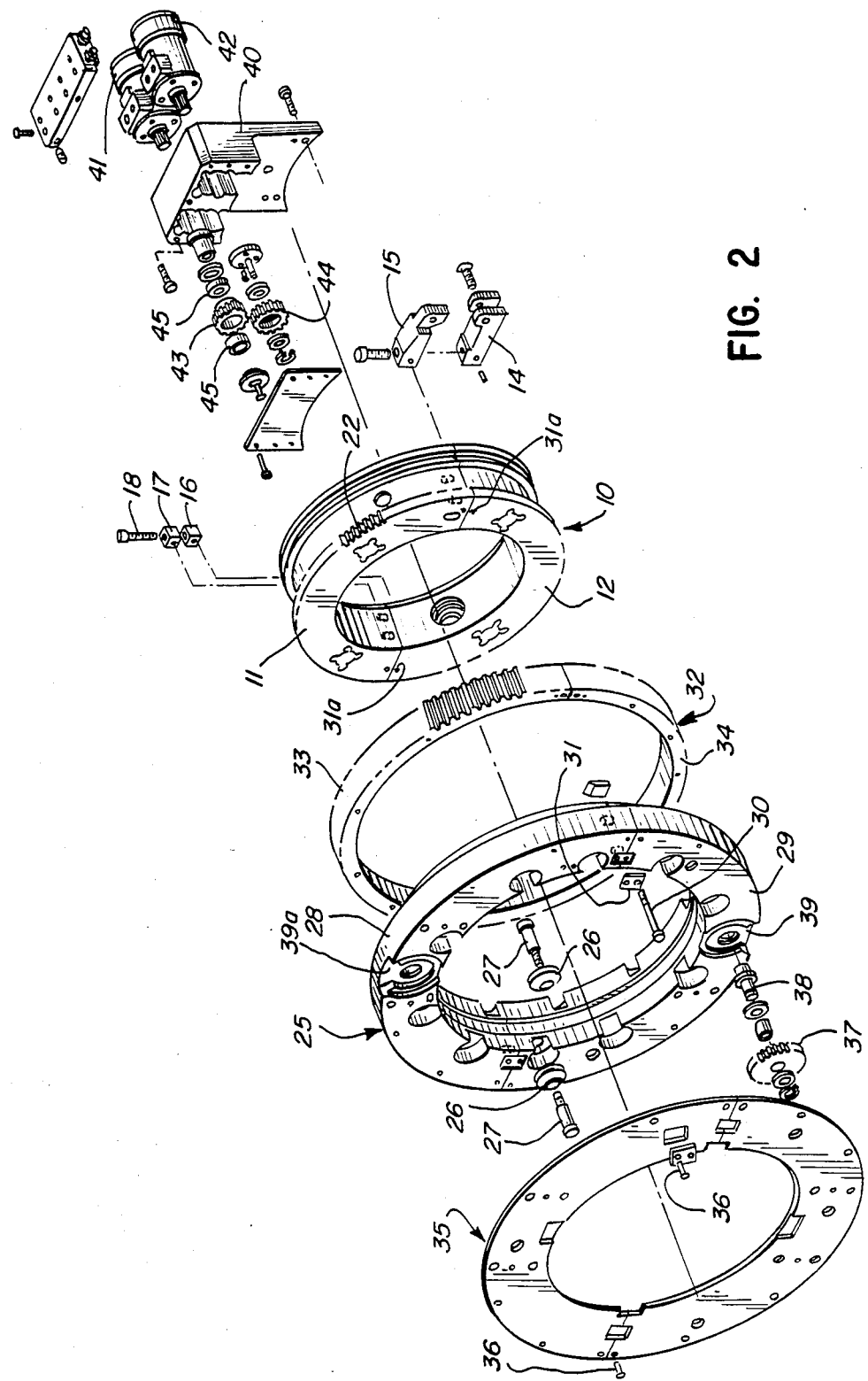
FIG. 2 is an exploded view of the basic split frame structure.
Figure 3:
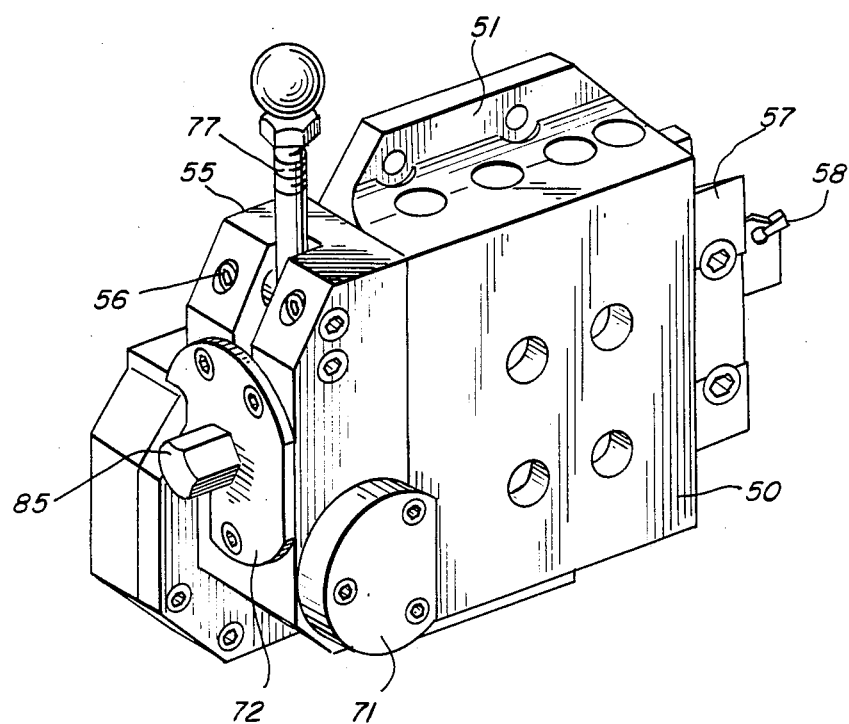
FIG. 3 is a perspective elevational view of a cutoff slide attachment for performing a cutoff operation.
Figure 4:
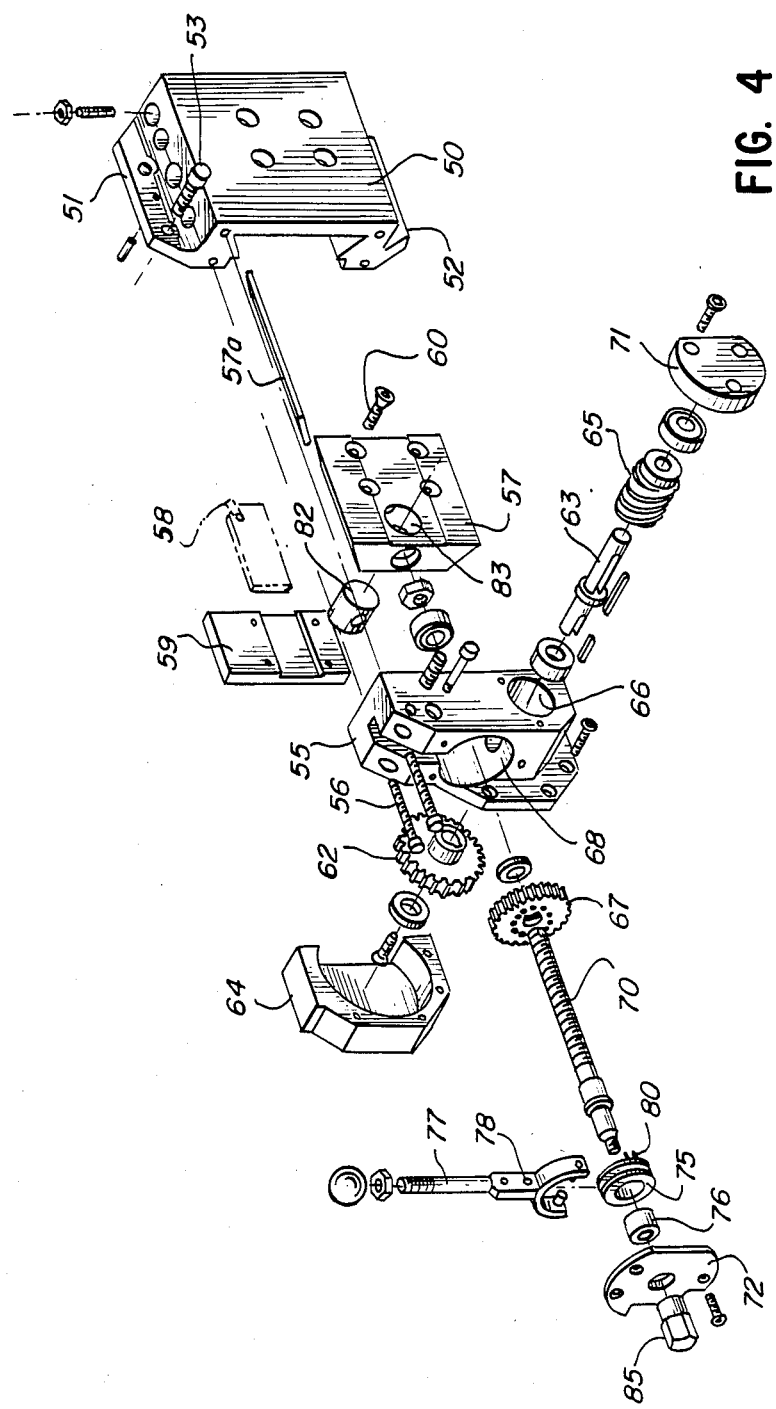
FIG. 4 is an exploded view of the cutoff slide attachment shown in FIG. 3.
Figure 7:
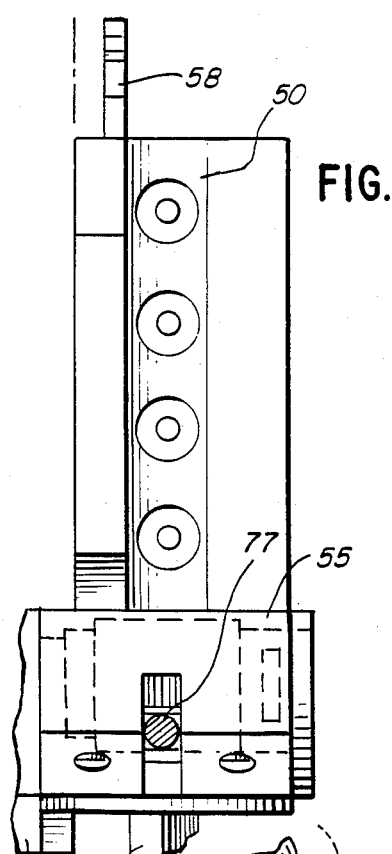
FIG. 7 is a top view of the cutoff slide attachment shown in FIG. 4.
Figure 6:
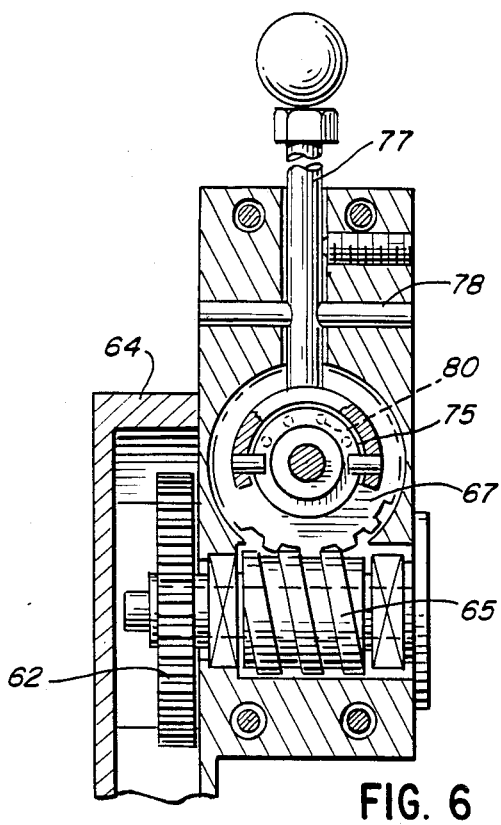
FIG. 6 is a fragmentary sectional view taken generally along the line 6—6 in FIG. 5.
Figure 5:
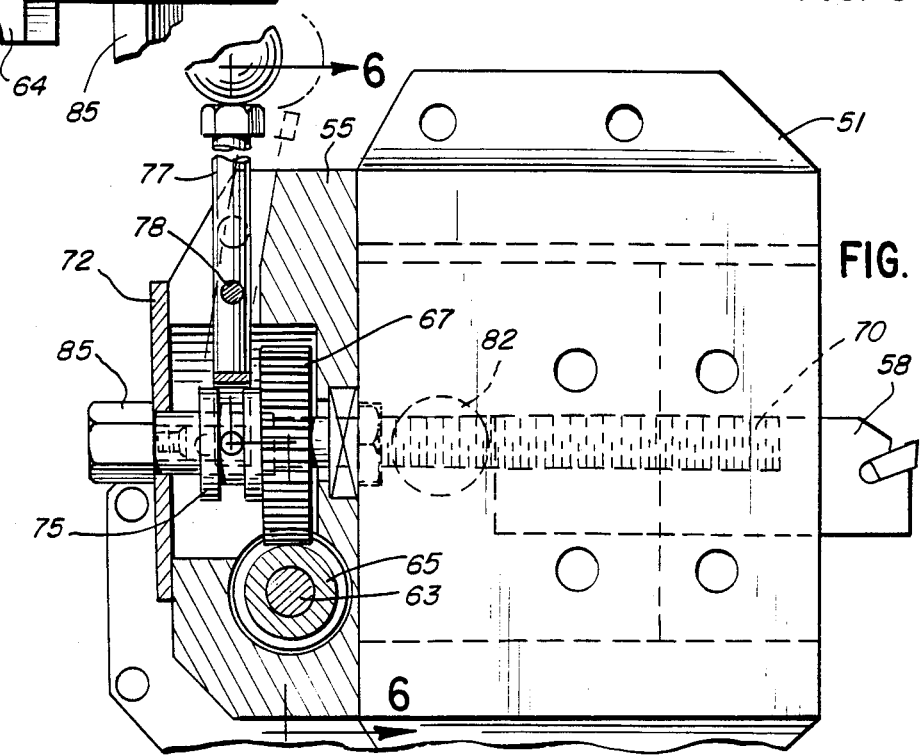
FIG. 5 is a side view of the cutoff slide attachment with parts broken away.
Figure 8:
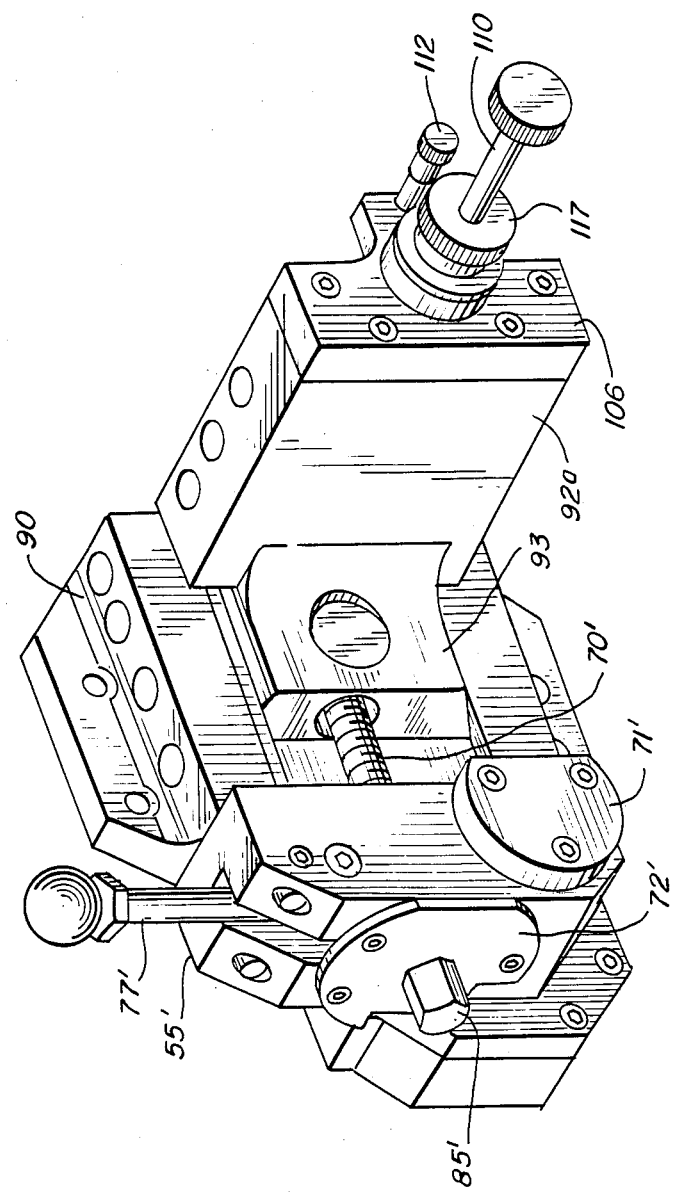
FIG. 8 is a perspective elevational view of a cam slide attachment.
Figure 9:
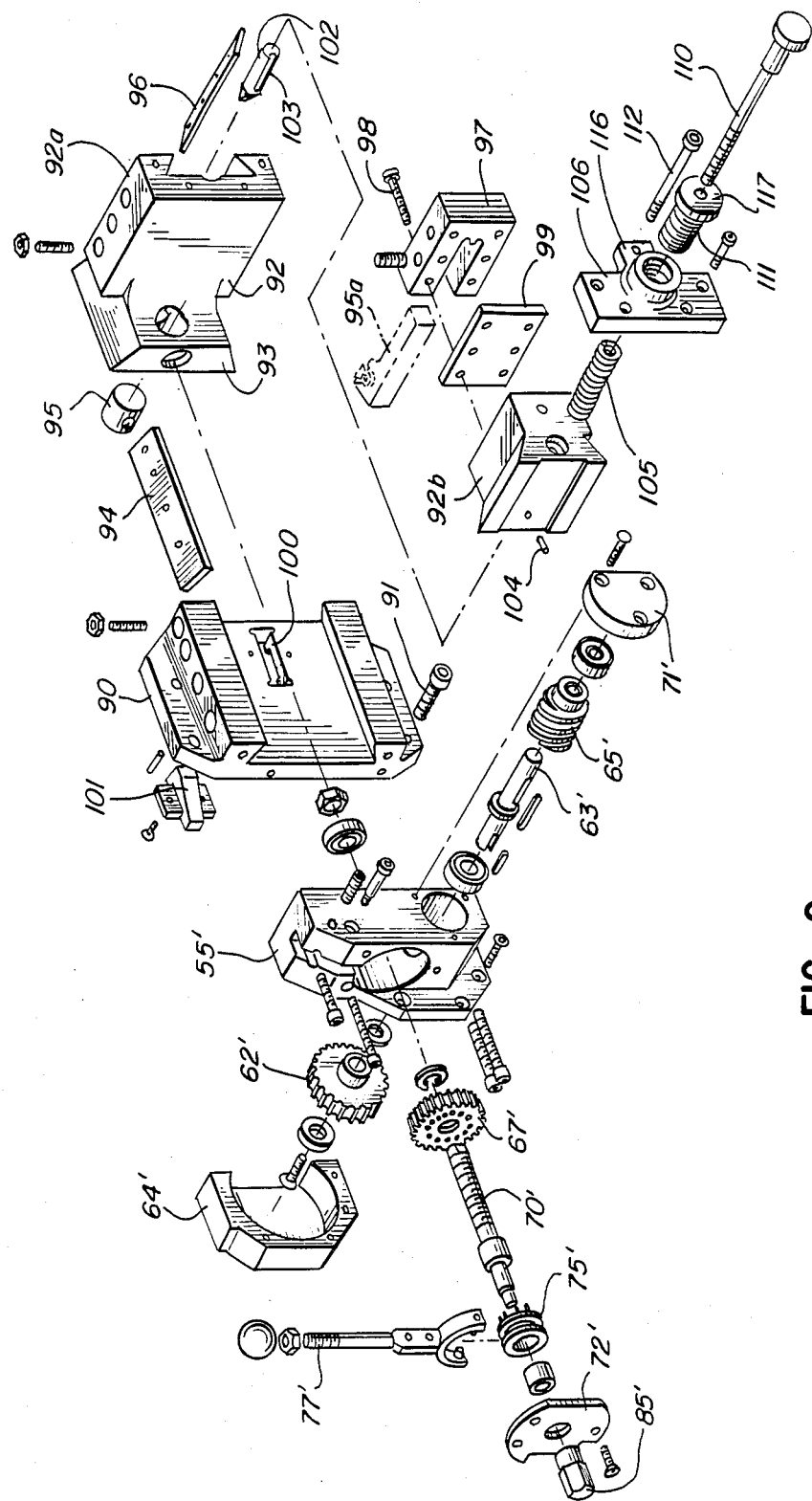
FIG. 9 is an exploded view showing the components of the cam slide attachment of FIG. 8.
Figures 10, 11:
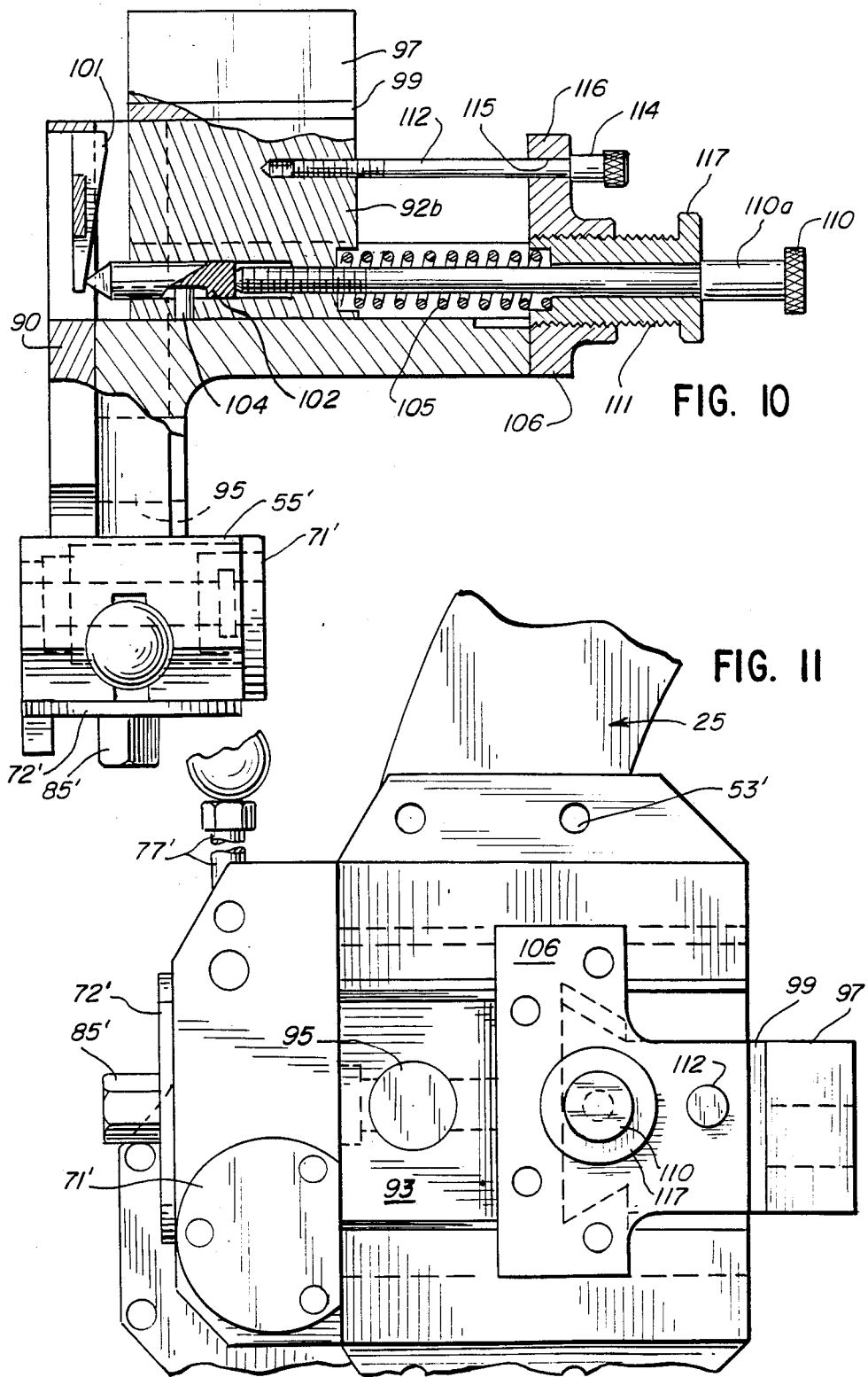
FIG. 10 is a partial plan view of the cam slide attachment of FIG. 8.
FIG. 11 is an elevational view of the cam slide attachment looking at the attachment from the right in FIG. 8.
Figure 12:
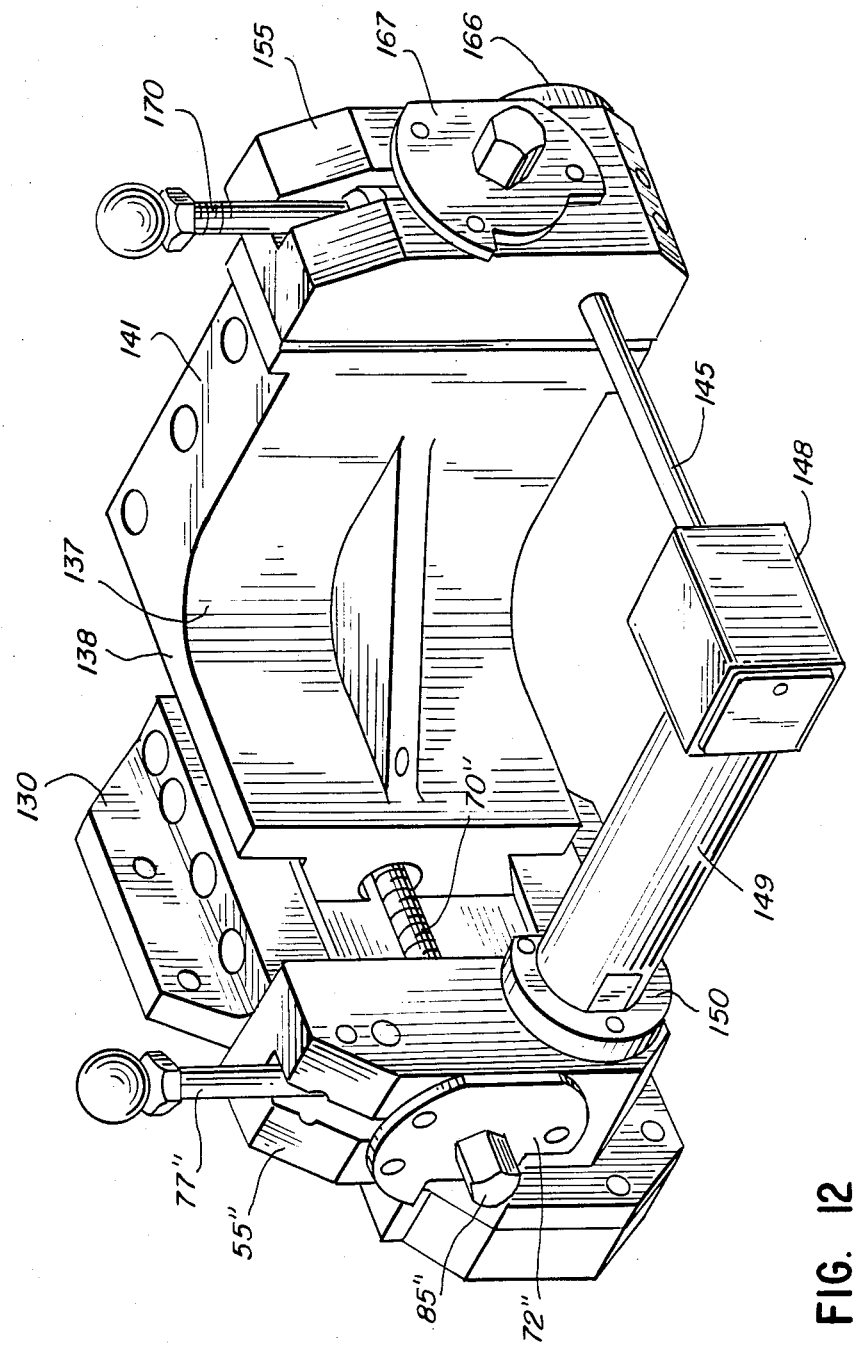
FIG. 12 is a perspective elevational view of the dual axis X-Y slide attachment.
Figure 13:
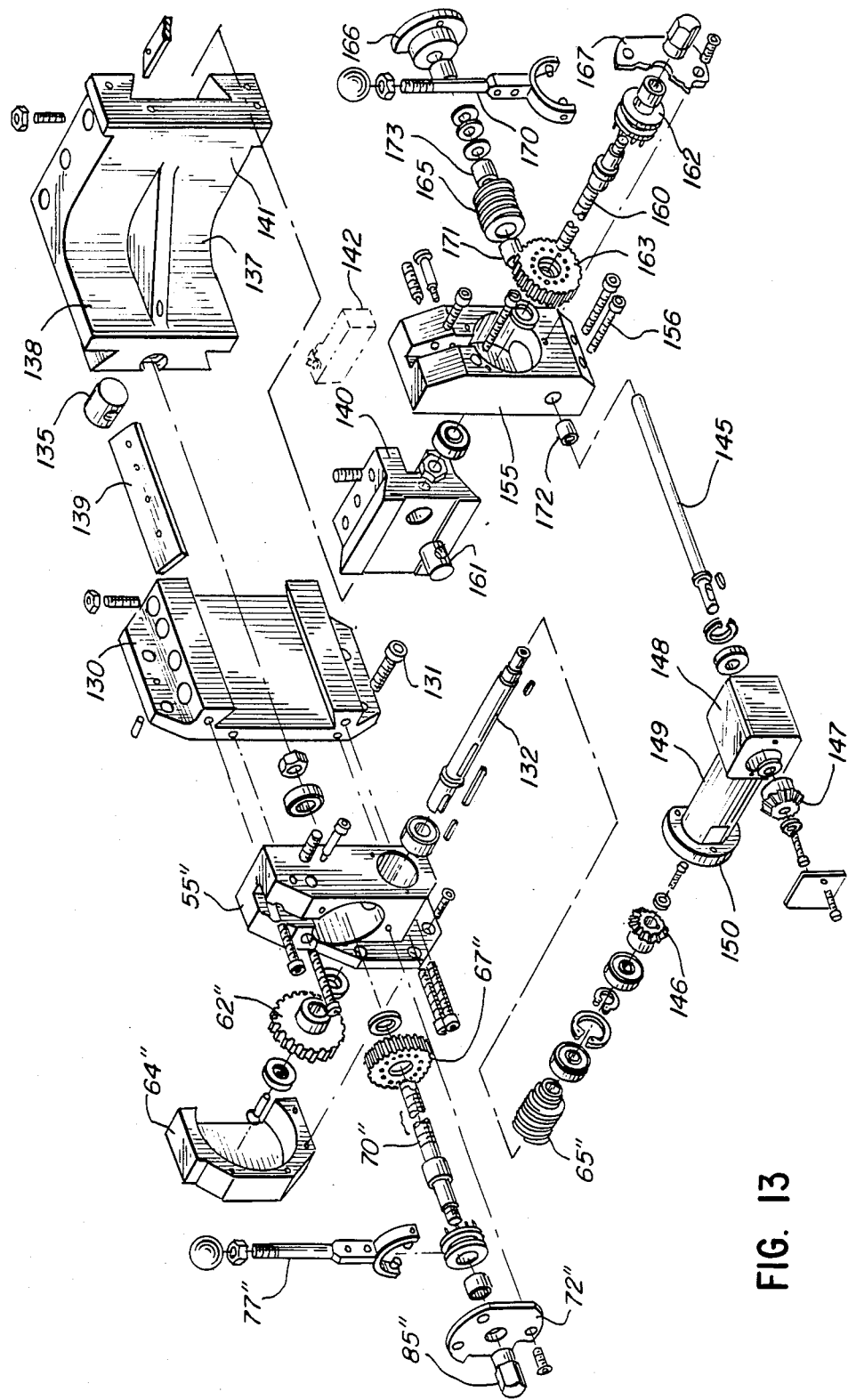
FIG. 13 is an exploded view showing the components of the X-Y slide attachment of FIG. 12.
Figure 14:
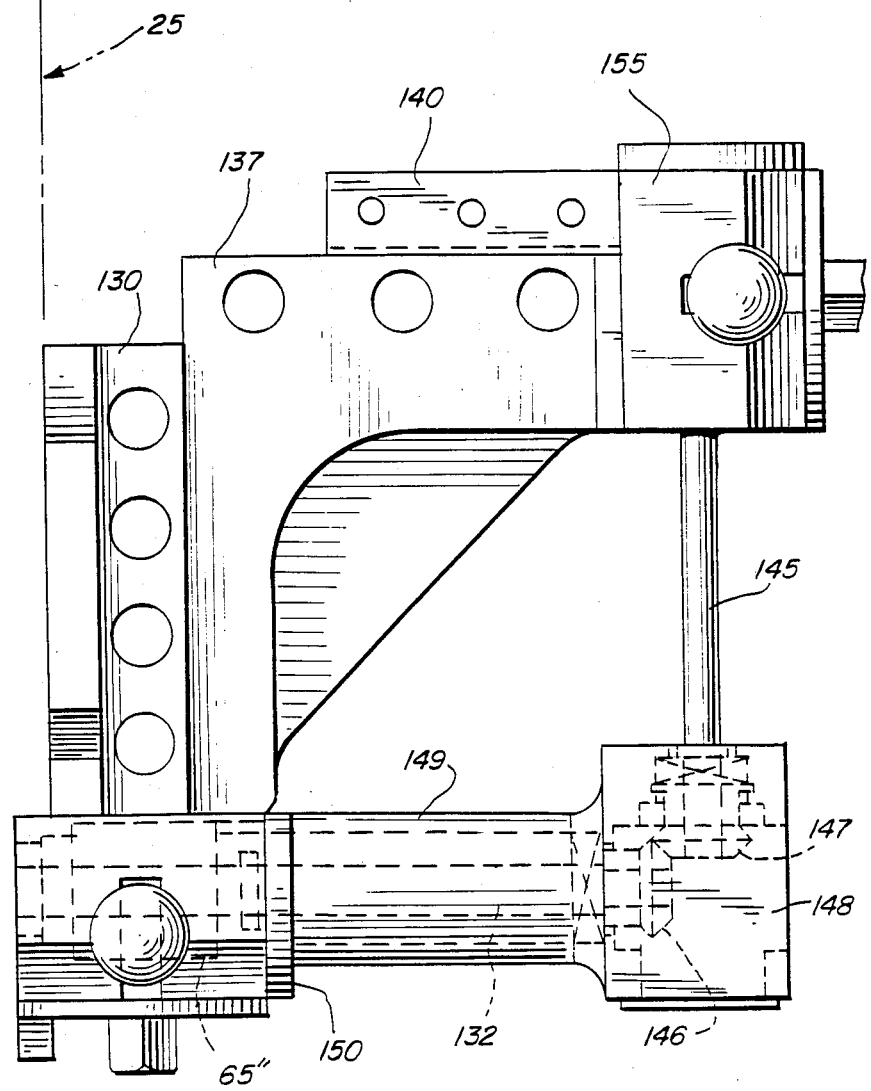
FIG. 14 is a plan view of the X-Y slide attachment shown in FIG. 12.
Figure 15:
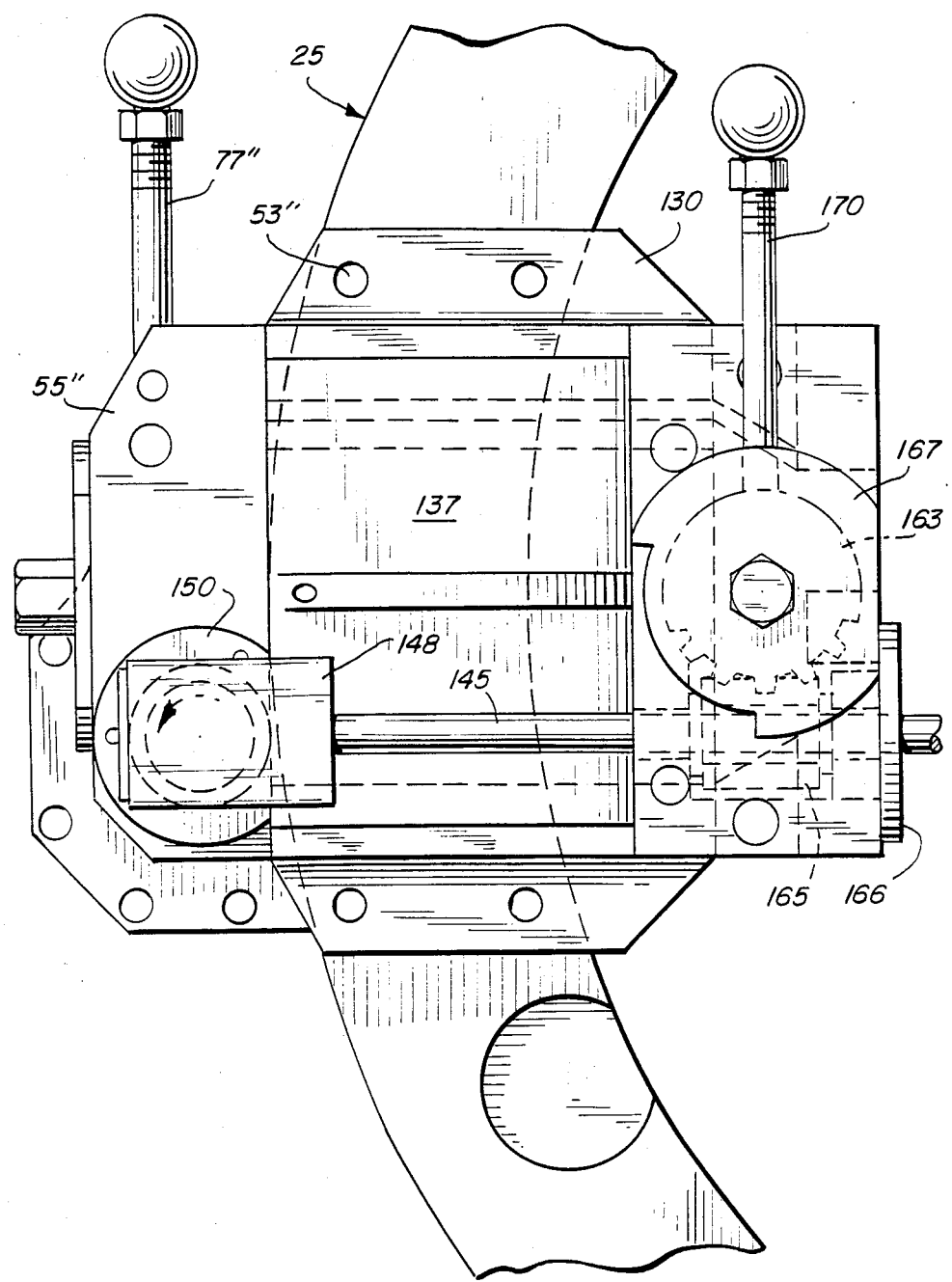
FIG. 15 is a side elevational view of the X-Y slide attachment viewed from the right of the attachment as shown in FIG. 12.
Figure 16:
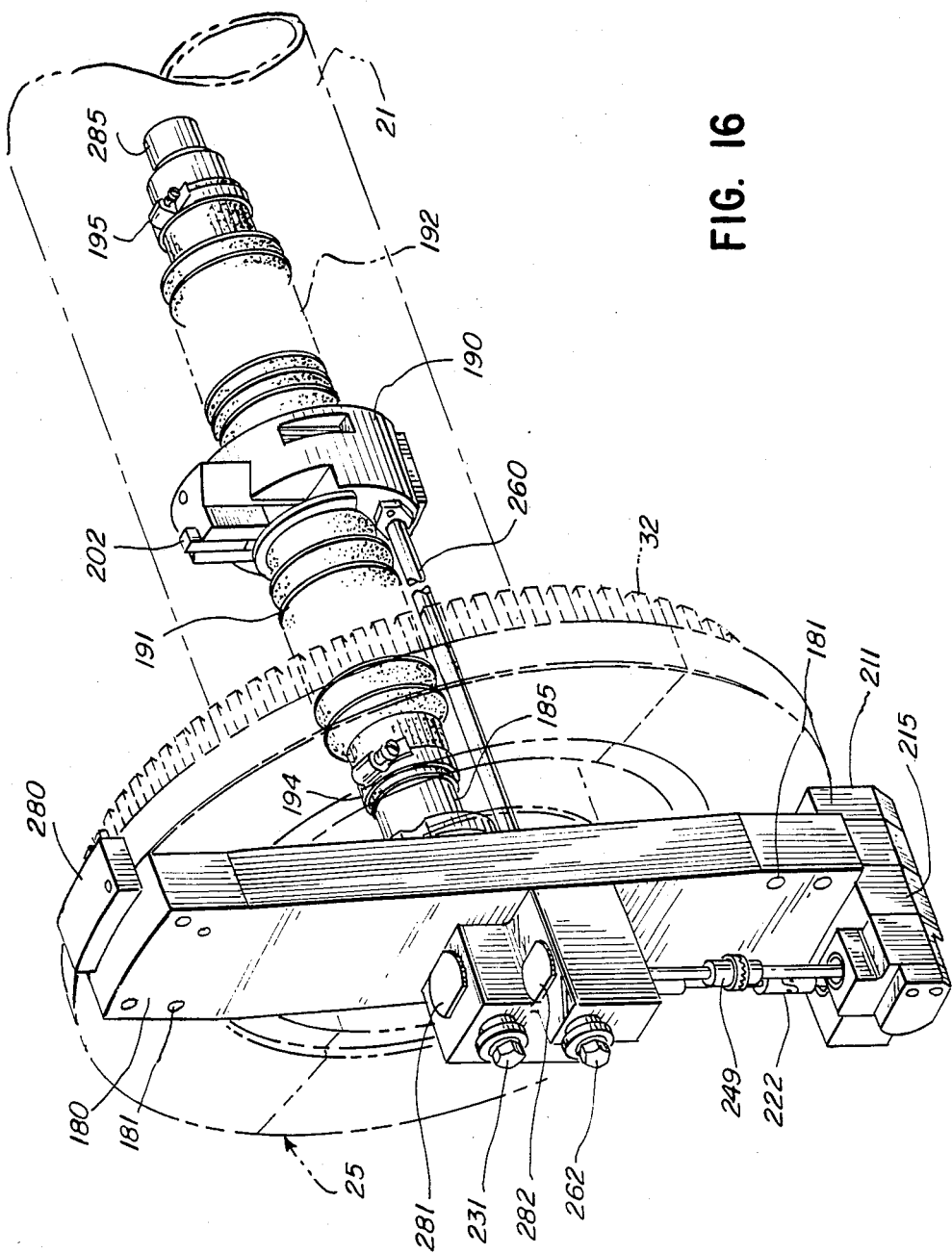
FIG. 16 is a perspective view of the boring bar attachment shown in association with a pipe in broken line.

As seen particularly in FIGS. 1 and 2, the pipe machining apparatus has a split frame with an inner ring 10 having semi-annular ring sections including an upper ring section 11 and a lower ring section 12 which are hinged together by a hinge having a female hinge member 14 fastened to the lower ring section 12 and a male hinge member 15 fastened to the upper ring section 11. The hinge permits the opening of the ring sections to enable placement of the inner ring in surrounding relation to a pipe and the inner ring sections are then brought together into closed position and secured by a lock structure including a pair of threaded members 16 and 17 which are fixed one to each of the ring sections and which are interconnected by a threaded member 18.

Three equally spaced clamp members, one of which is shown at 20, can be extended inwardly from the ring sections by manually driven gearing to engage the periphery of a pipe, shown in broken line at 21, and lock the inner ring 10 to the pipe.

An external annular tool driving gear 22 is formed on the ring sections for driving a cutting tools in a manner described hereinafter.

An annular tool head indicated generally at 25 is rotatably mounted on the inner ring 10 by means of a plurality of guide wheels, two of which are shown at 26 and which are in rolling engagement, with the inner ring and fastened to the annular tool head by fasteners 27. The annular tool head 25 is formed of first and second sections 28 and 29 to enable opening thereof with the inner ring 10 for positioning on a pipe. The first and second sections are held to the ring sections and interconnected by two pairs of cap screws 30 and plates 31. The cap screws screw into openings 31a. An external annular gear indicated generally at 32 is formed of two sections 33 and 34 and is fixed to the respective tool head sections 28 and 29 and is associated with drive means carried by the inner ring for causing rotation of the annular tool head by cap screws 36. A two section chip ring, indicated generally at 35, is attached to a face of the annular tool head. The annular tool head can mount a pair of idler gears with one of these idler gears being shown at 37. This idler gear is rotatably mounted on an idler shaft 38 positioned within a recess 39 opening to the inner periphery of the annular tool head. A similar recess 39a is provided if two idler gears are to be used for two tools slides. This idler gear is in the plane of and in mesh with the annular tool driving gear 22 on the inner ring 10. A the annular tool head 25 rotates by operation of the drive means to be described, there is resulting rotation of the idler gear 37 because of its meshing with the stationary tool driving gear 22.

The drive means for the annular tool head includes a housing 40 fixed to and extending upwardly from a face of the inner ring 10 and mounting a pair of hydraulic drive motors 41 and 42. Each motor drives a pair of meshing spur gears 43 and 44. The spur gear 43 is connected to the drive shaft of a drive motor through a one-way clutch 45 associated with the spur gear 43 and the spur gear 44 meshes with the external annular gear 32. There is a similar drive from the drive motor 42 to spur gears 46 and 47 which is not shown in FIG. 2. The one-way clutches operate to transmit a drive from the fluid motors to the spur gears while enabling reverse rotation of the annular tool head 25 for positioning of a cutting tool carried by a cutting attachment to be described.

A first of the cutting attachments is shown in FIGS. 3–7 and is a cutoff slide attachment for single axis cutting. This attachment has a female tool slide member 50 with a pair of flanges 51 and 52 which enable mounting thereof to the annular tool head 25 by a plurality of cap screws 53 extended through flange openings and threaded into threaded openings 54 in the face of the annular tool head. A housing 55 is attached to an end of the female tool slide member 50 by cap screws 56 and a moveable tool slide member 57 has a dove tail sliding relation with the female tool slide member 50 including a gib 57a. The movable tool slide member 57 carries a cutting tool 58 held thereto by a retaining plate 59 secured to the movable tool slide member 57 by cap screws, one of which is shown at 60.

The movable tool slide member 57 is oriented for movement radially of the center line of the pipe 21 and is caused to move in response to rotation of the annular tool head 25. The means for moving the movable tool slide member 57 and the cutting tool 58 comprises a drive train driven by rotation of the idler gear 37 on the annular tool head which meshes with the annular tool driving gear 22 fixed to the inner ring 10. This drive train includes a driven gear 62 mounted on a worm shaft 63 in mesh with idler gear 37 and disposed within an end cover 64 of the housing 55. The worm shaft 63 mounts a worm 65 positioned within a cylindrical chamber 66 in the housing 55 to mesh with a worm gear 67 fitted within a cavity 68 in the housing 55 and freely rotatable on a threaded shaft 70. The threaded shaft is a lead screw. The chamber 66 is covered by a cover plate 71 and the cavity 68 is covered by a cover plate 72.

Rotation of the annular tool head imparts rotation to the driven gear 62 and the worm 65 for rotation of the worm gear 67. This rotation is selectively transmitted to the threaded shaft 70 by means of a clutch having a clutch sleeve 75 with a one-way clutch 76 press-fit therein and having a pivoted lever 77 pivoted at 78 to the housing 55. Additionally, the worm gear 67 has a series of openings and the clutch sleeve 75 has a series of pins 80 which can be brought into engagement to interconnect the clutch sleeve and the worm gear for transmitting drive through the one-way clutch 76 to the threaded shaft 70.

The threaded shaft 70 extends through the housing 55 and the worm gear 67 and is threaded into a bushing 82 fitted in an opening 83 in the movable tool slide member 57 whereby rotation of the threaded shaft results in movement of the movable tool slide member 57 in the female tool slide member 50 radially of the pipe.

The one-way clutch 76 permits rotation of the threaded shaft for movement of the movable tool slide member independently of the drive train in one direction of rotation by manual rotation of a nut 85 fixed to an end of the threaded shaft.

As previously stated, the rate of feed of the cutting tool is dependent upon the rate of rotation of the annular tool head 25 and the drive ratios in the drive train between the idler gear 37 and the threaded bushing 82. This ratio can be easily varied to vary the feed rate of the movable tool slide member by change of either the threaded shaft 70 and the threaded bushing 82 or the worm 65 and worm gear 67, or both, by removal of the cover plates 71 and 72.

The cam slide attachment, shown in FIGS. 8–11, has part of the structure thereof identical to that described in connection with the cutoff slide attachment shown in FIGS. 3–7. The structure that is the same in both attachments has the same reference numeral with the same structure in the cam slide attachment being primed.

The female tool slide member 90 is attached to the annular tool head 25 by means of cap screws 91 fitted in the threaded openings 54 of the annular tool head and the movable tool slide member 92 is L-shaped with one leg 93 having a dove tail sliding relation with the female tool slide member 90 and with there being a gib 94 disposed therebetween. The leg 93 has a threaded bushing 95 fitted therein which threadably receives the threaded shaft 70'. A second leg 92a of the movable tool slide member is at right angles to the leg 93 and movable receives a third tool slide member 92b with matching dove tails and a gib 96. The third slide member 92b carries a cutting tool 95a held in a tool retainer 97 secured to the third tool slide member 92b by cap screws 98 and with a spacer plate 99 therebetween.

The movement of the cutting tool 95a toward the pipe is achieved by operation of the drive train driven by the driven gear 62' and rotation of the threaded shaft 70'. The cam action for movement of the cutting tool 95a transverse to the movement toward the pipe for cutting a bevel on the pipe is achieved by coaction between a cam and a cam follower. The female tool slide member 90 has an opening 100 which receives a cam 101 suitably fixed thereto and which is exposed for engagement by a cam follower 102 movably carried by the third tool slide member 92b. The cam follower 102 has a slot 103 engaged by a pin 104 in the third tool slide member to prevent rotation. The third tool slide member 92b and the cam follower 102 are urged toward the cam 101 by a spring 105 which is captured between a third tool slide member 92b and an end cover 106 which attaches to an end of the leg 92a of the movable tool slide member 92. The spring 105 surrounds a stem 110 threaded into the third tool slide member 92b and positioned within a spring tensioning member 111 threaded into the end cap 106. In order to limit movement of the third tool slide member 92b in one direction, a rod 112 is threaded into the third tool slide member 92b and has an enlarged end 114 which limits movement of the rod through an opening 115 formed in an ear 116 of the end cap 106. The stem 110 controls the cutting depth by abutting the end of the cam follower 102 and by rotative lengthwise adjustment. An enlarged end 110a on the threaded stem 110 abuts an end 117 of the spring tensioning member 111 to limit inward movement of the threaded stem 110.

The cam slide attachment enables cutting of a bevel with the angle of the bevel being determined by the slope of the cam 101 and thus the bevel angle can readily be changed by use of a cam 101 to a cam having a different slope. The angle of the cam can be reversed for inside-out beveling.

The dual axis X-Y axis slide attachment is shown in FIGS. 12–15 and part of the structure thereof is identical to that described in connection with the cutoff slide attachment shown in FIGS. 3–7. The structure that is the same in both attachments has the same reference numeral with the same structure in the dual axis X-Y slide attachment being double primed.

A female tool slide member 130 is mountable to the annular tool head 25 by means of cap screws 131 threaded into the openings 54 in the annular tool head. Associated with the female tool slide member is a housing 55" having a driven gear 62" associated with a worm 65" on a worm shaft 132. A threaded shaft 70" coacts with a threaded bushing 135 mountable in an L-shaped movable tool slide member 137 having a leg 138 with a dove tail sliding relation with the female tool slide member 130 and with an interfitted gib 139. The treaded shaft 70" has the same releasable drive connection as the embodiment of FIGS. 3–7 including the worm gear 67". A drive connection from the driven gear 62" to the threaded shaft 70" results in movement of the movable tool slide member 137 radially of a tube to be machined.

A cutting tool 142 is carried by a third tool slide member 140 which has a slidable dove tail mounting in a leg 141 of the L-shaped movable tool slide member 137. Movement of the movable tool slide member 137 relative to the female tool slide member 130 provides for movement of the cutting tool 142 along a Y axis and movement of the third tool slide member 140 provides for movement of the cutting tool along an X axis parallel to the pipe.

Movement of the third tool slide member 140 is achieved by a drive from the driven gear 62" by a drive connection from the worm shaft 132 to a worm shaft 145, this drive connection is through a pair of meshing bevel gears 146 and 147 associated with the worm shafts 132 and 145 respectively and mounted within a housing 148 having a tubular extension 149. The tubular extension 149 receives a part of the worm shaft 132 and has a flange 150 at an end thereof which fastens to a face of the housing 55". The worm shaft 145 extends into a housing 155 fastened to an end of the leg 141 of the movable tool slide member by cap screws 156. The structure for causing movement of the third tool slide member 140 is basically the same as the structure for causing movement of movable tool slide member 137. This structure includes a threaded shaft 160 in threaded relation with a bushing 161 fitted in the third tool slide member 140. A selectively operable clutch includes a clutch sleeve 162 selectively engageable with a worm gear 163 with the parts having the previously described pins and openings for driving engagement. The worm gear 163 meshes with a worm 165 on the worm shaft 145 and which is mounted within an opening in the housing 155 with the opening closed by a cover plate 166. The opening for the worm gear 163 is closed by a removable cover plate 167 and the clutch sleeve 162 is operable by a pivoted lever 170. A one-way clutch 171 is press-fit in the worm 165 and the worm shaft 145 has needle bearings 172 and 173. This mounting enables movement of the worm 165 along the worm shaft 145 in response to movement of the movable tool slide member 137 along the female tool slide member 130.

With the X-Y slide attachment, there can be movement of a cutting tool along two axes when both of the selectively operable clutches are engaged. As in the embodiment of FIGS. 3–7, the movement along these axes is determined by the rate of rotation of the annular tool head 25 and the pitch of the worm and worm gear an the threaded shaft and threaded bushing in the drives for movements along both axes. With the removable cover plates, it is possible to change the pitch of either of the worm and worm gear sets and is also possible to simply replace a threaded shaft and a threaded bushing with the same components of a different pitch to provide a highly versatile dual axis cutting attachment.

FIGS. 16–20 disclose a boring attachment. The boring attachment is shown in association with the annular tool head 25 and a pipe 21 in FIG. 16.

The boring attachment has a cross head 180 attachable to the annular tool head by cap screws 181 extendable through sets of openings 182 and 183 at opposite ends of the cross head and threaded into opposed sets of threaded openings 54 in the annular tool head.

The cross head 180 rigidly mounts a cylinder 185 in cantilever fashion by means of a flanged sleeve 186 fitted to the cylinder and attached to the face of the cross head. The cylinder extends through the annular tool head centrally thereof to have a central axis coincident with the central axis of the pipe to be machined. The cylinder 185 slidably mounts a boring head 190 with a pair of flexible convoluted tubing sections 191 and 192 positioned on the cylinder at either side of the boring head. The sections at their opposite ends are fixed to the cylinder and the boring head respectively to prevent exposure of slots in the cylinder to chips created during machining. the attachment structure includes a pair of hose clamps 194 and 195 which clamp onto tubular ends 196 and 197 of the tubing sections 191 and 192. The opposite ends of tubing sections 191 and 192 have ring structure 198 and 199 interconnecting the tubing sections 191 and 192 and opposite faces of the boring head 190.

The boring head 190 movably mounts a tool slide 200 for movement radially of the pipe by means of a dove tail slide connection therebetween with the tool slide member being movable in a dove tail slot 201 in boring head 190. The tools slide 200 holds a cutting tool 202. A chip guard 205 can fit against a face 206 of the boring head to protect a cavity 207.

The boring head is moved axially of the cylinder 185 by a drive resulting from rotation of the annular tool head 25. This drive includes a driven gear 210 rotatably mounted at an end of the cross head 180 and partially enclosed within a recessed cover member 211 fixed to the cross head and which directly engages the external annular tool driving gear 22 on the inner ring 10. The driven gear 210 is mounted on a worm shaft 2112 having a worm 213 meshing with a worm gear 214 rotatable within a housing 215 and which has a cover plate 216. The worm gear 214 is fixed to a shaft 220 which is drivingly connected to a shaft 221 through a pair of universal joints 222 and 223 which enable transmission of a drive from the shaft 220 to the shaft 221 from a location offset from the centerline of the cross head 180 to a location at the centerline and coaxial with the axis of the cylinder 185 and the pipe 21. The shaft 221 is mounted within a housing 225 and has a bevel gear 226 thereon which meshes with a bevel gear. The bevel gear 227 has a selective tooth coupling with a sleeve 228 surrounding an end of a threaded shaft 230 and which has a nut 231 on an end thereof and a one-way clutch 232 is inside the toothed sleeve 228. This provides a selective engageable drive from the driven gear 210 to the threaded shaft 230 which extends outwardly of the housing 225 and through an opening 235 in the cross head 180. The threaded shaft 230 has threaded engagement with a key member 240 fixed in the boring head 190. Rotation of the threaded shaft 230 results in linear movement of the boring head 190 along the cylinder 185. The boring head 190 is prevented from rotation by the key member 240 being movable along a slot 245 extending along the top of the cylinder 185 for part of the length thereof.

The tool slide 200 is selectively movable radially of the pipe 21 by a drive from the driven gear 210. This drive includes a bevel gear 246 on the worm shaft 212 positioned within a housing 247 and which meshes with a bevel gear 248 on a shaft 249 carrying one element 250 of a multi-jaw coupling with another element 251 thereof being fixed to a shaft 252 which extends into the housing 225 and mounts a bevel gear 254 which meshes with a bevel gear 255. The bevel gear 255 has a selectively engagably tooth coupling with a toothed sleeve 256 associated with a one-way clutch 257 mounted on a feed shaft 260 which extends into the housing 225 and through an opening 261 in the cross head and which has a nut 262 at an end thereof. The feed shaft 260 extends to the boring head 190. A worm 265 has one-way clutches 269 press-fit therein. The worm 265 meshes with a worm gear 266 fixed to a threaded shaft 267 which is in threaded engagement with a threaded bushing 268 fitted in the tool slide 200. A recess in the boring head 190 is closed by a cover plate 270.

As previously mentioned, the cylinder 185 has the slot 245 associated with the key 240. Additionally, the cylinder 185 has a slot 275 extending along a part of its length at the bottom thereof to permit longitudinal movement of the threaded shaft along the cylinder as the boring head 190 moves axially of the cylinder.

The one-way clutches 269 and worm 265 move along the feed shaft 260 as the boring head 190 moves axially of the cylinder 185.

The boring head can be operated with either axial movement only of the tool 202 or movement thereof radially of the pipe or a combination of both dependent upon the drive connections made by toothed couplings to the bevel gears 227 and 255.

Figure 17A:
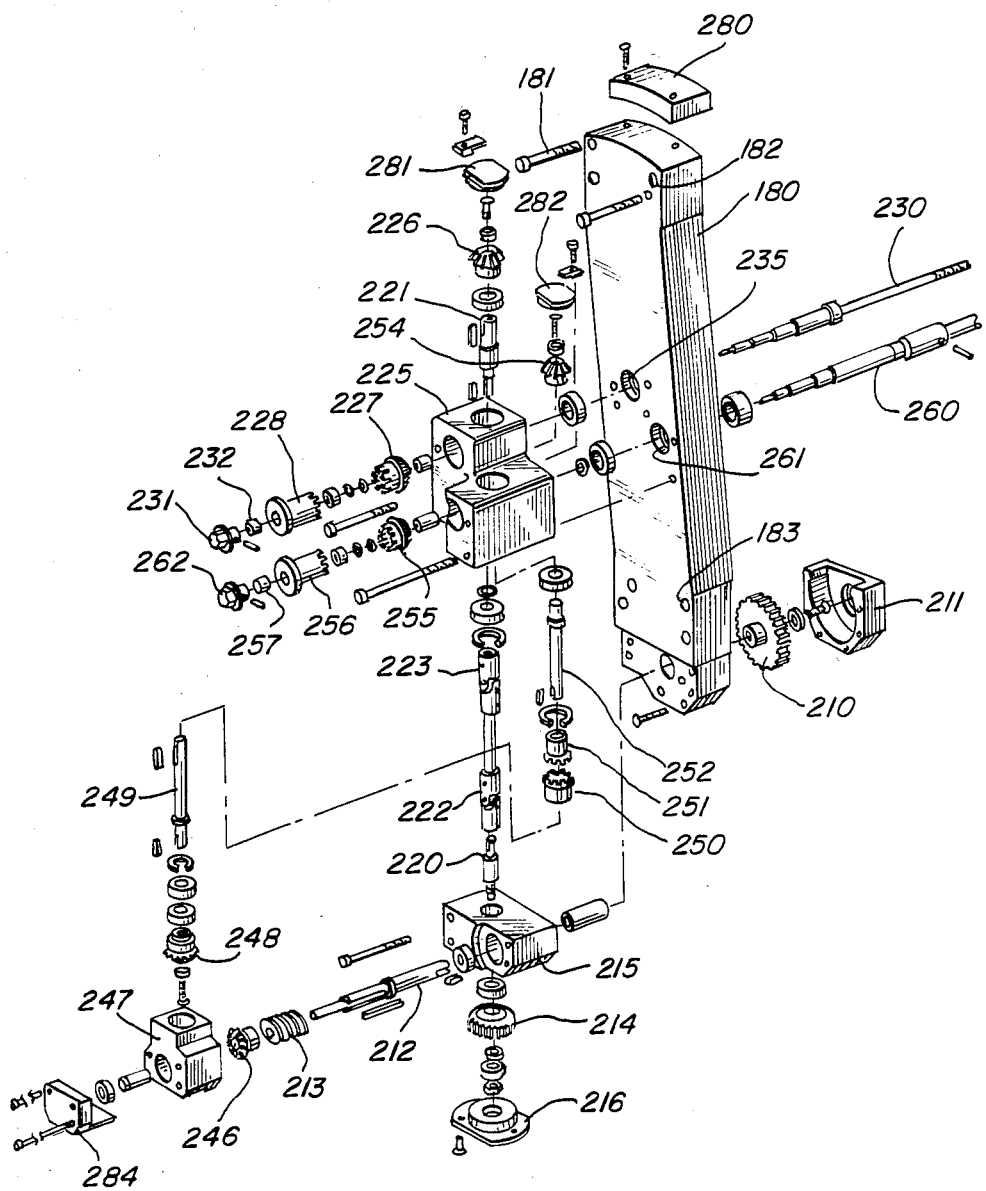
FIG. 17A is a partial exploded view of the components of the boring bar attachment.
Figure 17B:
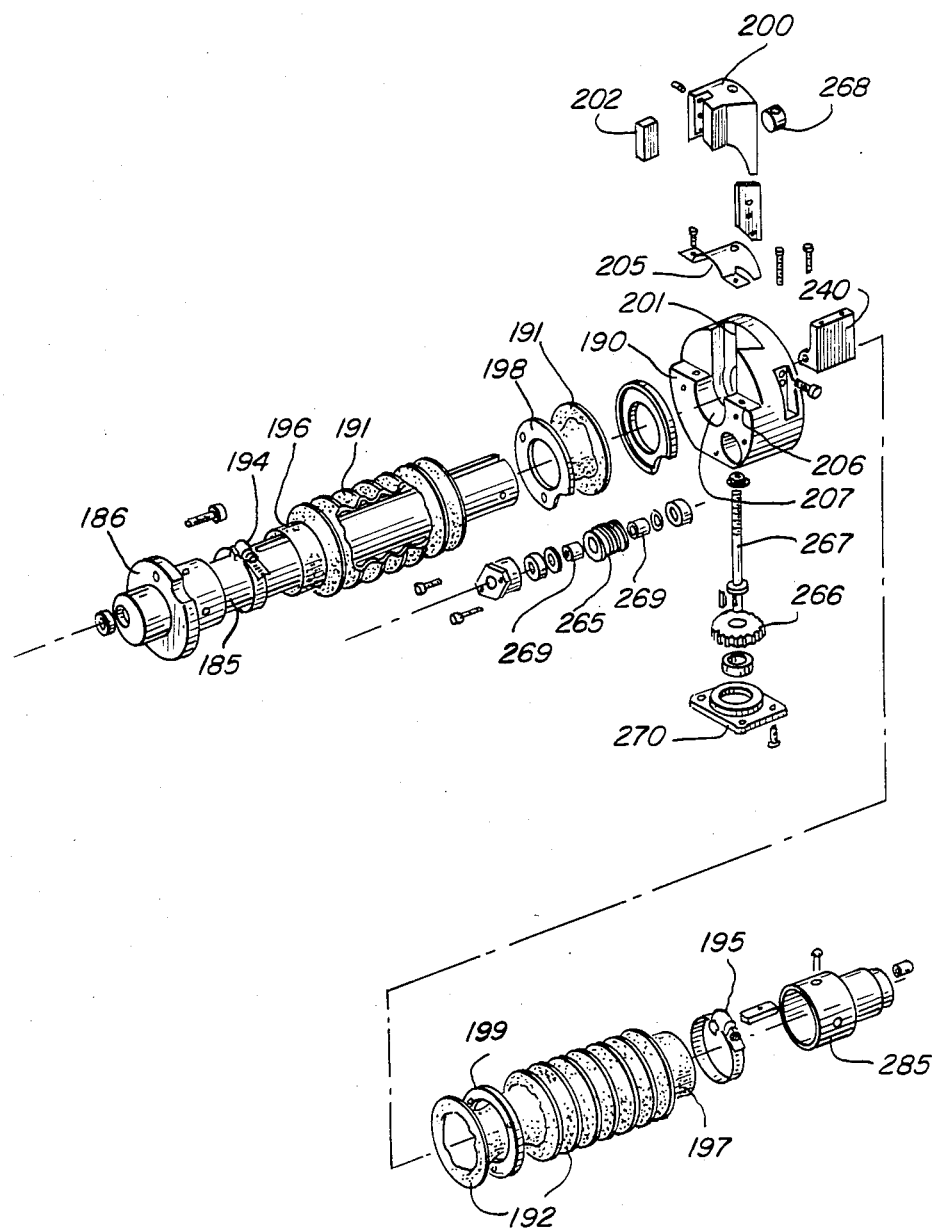
FIG. 17B is an exploded view of additional components of the boring bar attachment.

A number of individual miscellaneous components are shown in FIGS. 17A and 17B. In FIG. 17A, a gear cover 280 is attachable to an end of the cross head 180. A pair of cover plates 281 and 282 close off the upper ends of openings in the housing 225 and a cover plate 284 closes off an end of the housing 247. In FIG. 17B, an end cap 285 forms an end closure for the cylinder 185.

I claim:

1. A pipe machining apparatus having a rotatable annular tool head positionable in surrounding relation to a pipe and means on the annular tool head for selectively advancing a cutting tool relative to the pipe along two mutually perpendicular axes in response to rotation of the annular tool head comprising, a female tool slide member fixed to the annular tool head, a movable tool slide member movable in said female tool slide member for movement along a first axis, a third tool slid member movable mounted in said movable tool slide member for movement along a second axis normal to said first axis, means for moving said movable tool slide member along said first axis including a gear-driven threaded shaft and a manually operable clutch, means for moving said third tool slide member along said second axis including a gear-driven threaded shaft and a manually operable clutch, and a drive connection from the means for moving the movable tool slide member along the first axis to the means for moving the third tool slide member.

2. A pipe machining apparatus comprising:
   an inner ring with clamping means for engaging a pipe and an external annular tool driving gear fixed thereto;
   an annular tool head rotatably mounted on the inner ring and having an external annular gear;
   drive means carried by the inner ring including a drive motor and a drive gear meshing with the external annular gear on the annular tool head;
   an idler gear on the annular tool head; and
   an X-Y slide attachment for mounting on the annular tool head including a pair of movable tool slide members, a female tool slide member fixed to said annular tool head and movably mounting said movable tool slide members, a pair of rotatably threaded shafts associated one with each movable tool slide member, and means for moving the movable tool slide members including said idler gear on the annular tool head operatively connected to the tool driving gear on the inner ring and a driven gear on said female tool slide member meshing with said idler gear, and a pair of releasable drive connections between said driven gear and said threaded shafts for selective movement of the movable tool slide members in response to rotation of the annular tool head including a pair of worm worms on a pair of shafts, a pair of worm gears loose on the threaded shafts engaged with the worms, a pair of clutches interconnecting said worm gears and said threaded shafts, said worms and worm gears being releasably mounted as well as said threaded shafts for interchangeability with different pitch elements to determine the feed rate of the movable tool slide members relative to the rate of rotation of the annular tool head, one of said shafts worm being connected to said driven gear, and a drive connection from said one worm shaft to the other of said worm shafts.

3. A pipe machining apparatus comprising: an inner ring with clamping means for engaging a pipe and an external annular tool driving gear fixed thereto; an annular tool head rotatably mounted on the inner ring and having an external annular gear; drive means carried by the inner ring including a drive motor and a drive gear meshing with the external annular gear on the annular tool head; a movable tool slide member; a female tool slide member fixed to said annular tool head and movably mounted said movable tool slide member; means for moving the movable tool slide member including a driven gear on the annular tool head operatively connected to the tool driving gear on the inner ring and which is caused to rotate by relative movement between the annular tool head and the inner ring, a rotatably threaded shaft interconnecting said tool slide members and causing relative movement therebetween in response to rotation thereof, and a releasable drive connection interposed between said driven gear and said threaded shaft for selective movement of the movable tool slide member in response to rotation of the annular tool head; a third tool slide member movable on the movable tool slide member; a releasable drive connection between the third tool slide member and the movable tool slide member; and a motion transmitting connection between the two releasable drive connections.

* * * * *